(12) United States Patent
Nielsen

(10) Patent No.: US 10,688,971 B2
(45) Date of Patent: Jun. 23, 2020

(54) WIPERLESS CLEANING SYSTEM FOR TRANSPARENT SURFACES USING AIR JETS

(71) Applicant: Jetwipe 2017 IVS, Ebeltoft (DK)

(72) Inventor: Dan Mønster Nielsen, Ebeltoft (DK)

(73) Assignee: Jetwipe 2017 IVS, Ebeltoft (DK)

( * ) Notice: Subject to any disclaimer, the term of this patent is extended or adjusted under 35 U.S.C. 154(b) by 113 days.

(21) Appl. No.: 15/572,341

(22) PCT Filed: May 9, 2016

(86) PCT No.: PCT/DK2016/050119
§ 371 (c)(1),
(2) Date: Nov. 7, 2017

(87) PCT Pub. No.: WO2016/177380
PCT Pub. Date: Nov. 10, 2016

(65) Prior Publication Data
US 2018/0272996 A1 Sep. 27, 2018

(30) Foreign Application Priority Data
May 7, 2015 (DK) .................................. 2015 70266

(51) Int. Cl.
*B60S 1/54* (2006.01)

(52) U.S. Cl.
CPC ...................... *B60S 1/54* (2013.01)

(58) Field of Classification Search
None
See application file for complete search history.

(56) References Cited

U.S. PATENT DOCUMENTS

| | | |
|---|---|---|
| 6,290,361 B1 | 9/2001 | Berzin |
| 2008/0308649 A1 | 12/2008 | Le Louarn et al. |
| 2010/0230991 A1* | 9/2010 | Fioravanti ............. B60J 1/2005 296/96.15 |
| 2014/0117701 A1 | 5/2014 | Davis et al. |

FOREIGN PATENT DOCUMENTS

| | | |
|---|---|---|
| WO | 2009060413 A2 | 5/2009 |
| WO | 2011006844 A1 | 1/2011 |
| WO | 2013179004 A1 | 12/2013 |

* cited by examiner

*Primary Examiner* — David Redding
(74) *Attorney, Agent, or Firm* — Dinsmore & Shohl LLP (57) ABSTRACT

A cleaning system for cleaning a surface of a windshield, window, light or side mirror of a vehicle or the surface of a window of a building includes at least one air flow generator, a plurality of nozzles, and a system of pipes and/or tubes to distribute air flow to the nozzles. The plurality of nozzles form a curved array of nozzles over the surface such that air jets are ejected by the nozzles and distributed over the surface.

27 Claims, 5 Drawing Sheets

WIPERLESS CLEANING SYSTEM FOR TRANSPARENT SURFACES USING AIR JETS

CROSS-REFERENCE TO RELATED APPLICATIONS

This application is the U.S. national stage of PCT/DK2016/050119 filed May 9, 2016, which claims priority of Denmark Patent Application PA 2015 70266 filed May 7, 2015 of which is hereby incorporated by reference in its entirety.

FIELD OF INVENTION

The invention relates to a wiperless cleaning system for transparent surfaces using air jets, and a method for controlling the air flow of the air jets in such a wiperless cleaning system.

BACKGROUND OF INVENTION

The windshield wiper was invented in 1903 and is still the standard window cleaning device for cars and other vehicles. During the 20$^{th}$ century, several improvements to the available system were presented and patented; however the main ideas of the original system, comprising a pivoting arm and a rubber blade, pushing away water from the glass surface, remain the same in the commercial solutions that are available today.

Although traditional wipers have been the industry standard for many decades, there are a number of disadvantages associated with the use of such cleaning devices. The wipers are not always capable of pushing away all the water on the glass surface; there is often a remaining thin layer of water, which can make the wiped area blurry and reduce visibility. This problem is particularly relevant when driving after dark and is a common problem when the rubber blades are not new. Wipers need to be replaced regularly. Traditional wipers may also distract the driver and reduce visibility when they are in use. Furthermore, they can scratch the class surface if there are for example small rocks under the rubber. Another inconvenience with traditional windshield wipers is that they are not capable of cleaning the entire windshield.

There have been various attempts to replace the traditional cleaning devices with alternative solutions involving vibrations, heat, air jets, sonic waves, development of special material or even lasers. However, none of these ideas has had any commercial success so far despite the numerous disadvantages with the traditional cleaning devices and the size and value of the global market.

SUMMARY OF INVENTION

The present disclosure therefore relates to a wiperless cleaning system that can replace traditional wipers. A first aspect of the present disclosure relates to a system for cleaning the car glass, lights and side mirrors based on air jets, the cleaning system comprising at least one air flow generator, a plurality of nozzles, and a system of pipes and/or tubes to distribute the air flow to the nozzles, the system configured such that air jets are ejected by the nozzles and distributed over the surface, wherein the plurality of nozzles form a curved array of nozzles over the surface. The surface may be any transparent surface of a vehicle to be cleaned. The curved array of nozzles may be arranged such that the substantially flat outlets of the nozzles abut each other, the curved array of nozzles. The plurality of nozzles may form a section of an ellipsoid. The presently disclosed air jet based cleaning system represents an efficient design for distributing flowing air over for example a windshield of a car. A windshield of car may have different shapes but can be simplified to a rectangle having a long lower edge, a long upper edge, and two side edges. A slightly curved array of nozzles has the advantage that it may direct water on the windshield towards the side edges of the windshield rather than straight towards the upper edge. Further use of the curved array of nozzles is explained in greater detail in the detailed description. The plurality of nozzles may alternatively be seen as one wide nozzle covering the surface to be cleaned. This may be achieved by e.g. nozzles abutting each other, potentially appearing as one wide nozzle. Alternative the cleaning system may be designed with only one wide nozzle.

Preferably hydrophobic liquid is applied to the surface that is cleaned. This can be done either by separate application or by having a system further comprising an inlet to the system of pipes and/or tubes, a mixer for mixing the hydrophobic liquid into the air jet, and thereby distribute the hydrophobic liquid over the surface.

The present disclosure further relates to an air jet based cleaning system and a surface such as the windshield of a car, wherein the windshield has a hydrophobic coating. In such a system the air jet based cleaning system can clean the prepared wind shield since rain will be removed more easily. Preferable the hydrophobic coating has a contact angle greater than 110°, or between 110° and 150° for water.

A further aspect relates to a method for regulating the air flow of the air jet used in a cleaning system based on air jets.

An air jet based system, used to clean the windshield/windows/lights/mirrors, can remedy all of the inconveniences and disadvantages with traditional wipers mentioned above. The system described in the presently disclosed system also provides other advantages.

The presently disclosed system has means for producing the needed air flow and a distribution system to distribute the air to a number of nozzles that distribute the air over the surfaces to be cleaned. The nozzles are placed at positions that take advantage of the air flow that emerges relative to the vehicle when the vehicle is moving i.e. they preferably generate air jets in the same direction as the air flow relative to the moving vehicle to obtain a combined air flow effect. Furthermore the angles between the air jets distributed by the nozzles and the surface have been optimized to obtain the maximum cleaning effect.

In relation to the aspect of the present disclosure relating to a method for regulating the air flow of the air jet used in a cleaning system based on air jets, the inventor has realized that by regulating the air flow based on the velocity of the vehicle, a more efficient cleaning system can be obtained. Alternatively the wind can be measured on the surfaces to be cleaned, which indicates the combined effect of the wind and the air flow that emerges relative to the vehicle when the vehicle is moving. This represents a more complex but also more accurate solution.

These and other aspects of the invention are set forth in the following detailed description if the invention.

DESCRIPTION OF DRAWINGS

The invention will in the following be described in greater detail with reference to the accompanying drawings. The drawings are exemplary and are intended to illustrate some of the features of the present method and unit and are not to be construed as limiting to the presently disclosed invention.

DETAILED DESCRIPTION OF THE INVENTION

The presently disclosed system relates to a cleaning system for cleaning the surface of a windshield, window, light and side mirror of a vehicle or the surface of a window of a building, comprising at least one air flow generator, a plurality of nozzles, and a system of pipes and/or tubes to distribute the air flow to the nozzles, the system configured such that air jets are ejected by the nozzles and distributed over the surface. Since the nozzles can be placed outside the windshield surface, they do not distract the driver of the vehicle and they do not obstruct the visibility for the driver. Furthermore, the air jet ejected by the nozzles typically disperses the water in shape of drops and therefore does not leave a thin layer of water as traditional wipers do. The nozzles are not worn out by mechanical impact from the glass as traditional wipers, which need to be replaced, and they do not scratch the glass. Depending on the force of the air jets and their positions, the air jet ejected by the nozzles may be capable of cleaning parts of the windshield that would not be possible to reach with traditional pivoting wipers. The system also has the advantage compared to traditional wipers that it can remove condensation from the surfaces. The system could also be used to clean any other transparent surface of any vehicle, including for example boats and ferries, campers, mobile homes and trailers.

Figure 2:
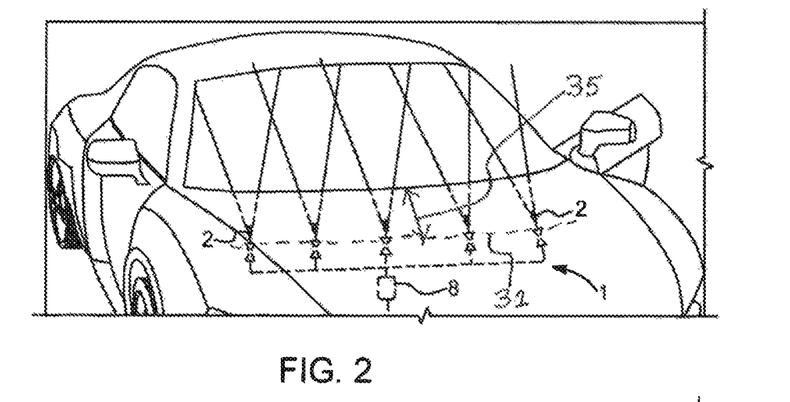
FIG. 2 shows an air jet based vehicle cleaning system comprising nozzles configured to perform high speed air jet without air compression.
Figure 14:
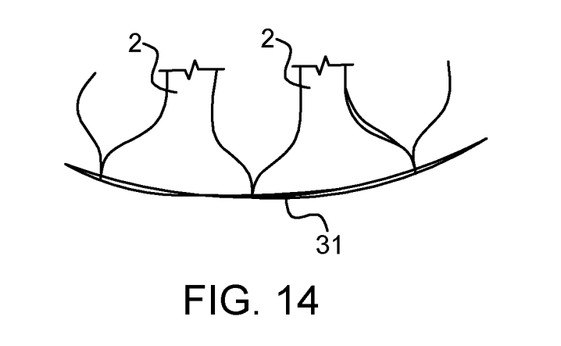
FIG. 14 shows an array of nozzles abutting each other and forming a section of an ellipsoid.

Preferably the plurality of nozzles form a curved array of nozzles over the surface. The curved array of nozzles may be arranged such that the substantially flat outlets of the nozzles abut each other, the curved array of nozzles. The plurality of nozzles may form a section of an ellipsoid 31 as shown in FIGS. 2 and 14. The presently disclosed air jet based cleaning system represents an efficient design for distributing flowing air over for example a windshield of a car.

In one embodiment the ellipsoid has one component parallel to the surface and/or one component perpendicular to the surface. A windshield may have a curved shape itself. In this case the curved array of nozzles may follow the curved windshield. This can be said to represent the component perpendicular to the surface. However, in the presently disclosed cleaning system there may also be a component parallel to the surface. Typically this can be represented by an array of nozzles arranged along the lower edge of the windshield, however being curved (bulging) towards the center of the windshield. The height 35, as shown in FIG. 2, of the center of the curving (bulging) part may be e.g. 1-25 cm, or 1-20 cm, or 1-15 cm, or 1-10 cm in relation to the lower edge of the windshield.

This may improve visibility for the driver since rain can be blown more towards the side edges of the windshield. In particular, for areas located close to the side edges it may be more efficient to blow towards the side edges than towards the upper edge across the windshield. The array of nozzles are configured to blow air distributed in a substantial ellipsoidal distribution over the surface or in the shape of a handheld fan shaped like the sector of a circle or an ellipse.

The nozzles may be placed 10 cm, or 8 cm, or 6 cm, or 4 cm, or 2 cm from the windshield for example substantially parallel to the lower edge of the windshield and/or placed below the windshield towards or under the bonnet. A bulging part of the curved array of nozzles may extend over the surface.

The system of pipes and/or tubes may be ducts connecting the air flow generator and nozzles. The nozzles may be an integral part of the system of pipes and/or tubes. The cross sections of the pipes/tubes may be circular or have any other suitable shape.

The generated air flow may be based on a system wherein a pressure inside the system is lower than 10.000 Pa, preferably lower than 7.000, even more preferably lower than 5.000 Pa. Using a relatively low pressure and high flow air pump makes the system power efficient. The cleaning system may be configured to generate an air flow of 50-2000 m$^3$/hour, or 100-1500 m$^3$/hour, or 100-1000 m$^3$/hour or 300-800 m$^3$/hour and/or configured to generate an air flow of 10-200 m/s, more preferably 30-150 m/s, even more preferably 50-130 m/s for air flowing out of the nozzles.

The air flow generators may be centrifugal blower(s) which provides the advantage that the system can operate at a relatively low energy level at a static pressure.

The system typically comprises ductwork in the form of multiple ducts that are typically mounted under the hood or bonnet of a vehicle. The ducts and/or nozzles may comprise guide vanes for directing the air flow. The possibility to control the direction of the air flow may be useful for several reasons. It may be used for compensating for other aerodynamic effects such as side wind and/or for distributing the air flow more evenly over the surface or directing a more powerful air flow towards an area the needs to be cleaned more thoroughly. In one embodiment the guide vanes are adjustable.

Additional guide elements may be mounted between the nozzles and the surface, wherein the guide elements are configured to compensate for placement of the nozzles in relation to the surface such that the air flow is more evenly distributed and/or compensate for side wind or other aerodynamic effects. The guide elements may be placed for example in a space below/in front of the windshield.

Figure 12:
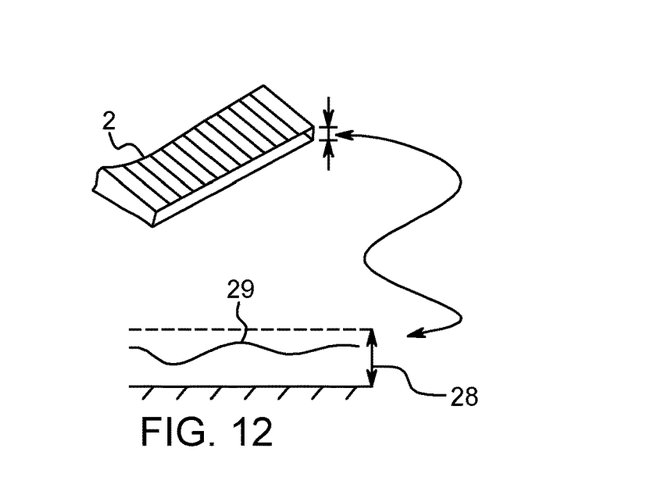
FIG. 12 shows a nozzle having an elongated and flat cross-section of an outlets.

In order to generated a powerful air flow the nozzles may be pointed and/or pointed cone-shaped. In an alternative embodiment the nozzles have outlets which cross-sections are elongated and flat low, such as having a height of less than 10 mm, more preferably less than 8 mm, even more preferably less than 5 mm, most preferably less than 2 mm. Flat and elongated nozzles mat be suitable for distributing flowing air over for example a windshield of a car. The shapes of such elongated outlet of the nozzles may be further shaped to create air flow specifically adapted to the shape of the surface. This can be achieved by curved shapes and/or irregular shapes of the elongated outlets. The nozzles may also have a substantially pointed shape in a cross section as shown in FIG. 12. In this embodiment the shape of the cross section is substantially tapered such that an elongated part towards the surface is flat and parts further away from the outlet have a larger diameter. In one embodiment the nozzle seen from the side may therefore have a tapered shape, but not necessarily tapered seen from above.

Furthermore neighbouring nozzles may be configured to abut each other, thereby creating a continuously shaped air flow. In particular a curved array of nozzles having substantially flat and elongated outlets, wherein the nozzles abut each other may be an efficient design for the presently disclosed cleaning system. Furthermore the nozzles may be arranged such that their distal parts, i.e. the parts towards the outlets, are connected such that air can flow between the nozzles. The outlets of several neighbouring outlets may thereby appear as one nozzle from the perspective of the surface.

In a vehicle, the supply of electrical power is limited and may be critical for the optimal functioning of the presently disclosed cleaning system. Even if the necessary supply of electrical power is achievable for a vehicle, it is desirable to minimise the power consumption of the presently disclosed system. By placing the nozzles in the presently disclosed system such that the angle between the surface and the outlet direction of the air jet is 15 degrees or less, for example 15, 14, 13, 12, 11, 10, 9, 8, 7, 6, 5, 4, 3, 2 or 1 degree(s), or 0 degrees (parallel), the maximum reach of the air jet, measured as the projection of the axis of the nozzle (axis 18 in FIG. 5) on the surface, is achieved. In one embodiment the nozzles are configured such that the angle between the surface and the outlet direction of the air jet is 0-15° or 1-15°. The outlet direction of the air jet is defined as the direction in which the air moves when it leaves the nozzle. By placing the nozzle such that half the radial spread of the generated air cone equals the angle between the surface and the outlet direction of the air jet, one side of the air cone is parallel to the surface.

By making the surface to be cleaned hydrophobic or self-cleaning, a less powerful air jet is needed to remove the water from the surface. The presently disclosed invention also relates to an air jet based cleaning system, configured such that hydrophobic liquid is applied to the surface automatically at predefined intervals. This ensures that the surface is always hydrophobic and thus requires a less powerful air jet, which in the end saves energy. The hydrophobic liquid can be for example a nanospray i.e. superhydrophobic spray coating. The hydrophobic liquid can also be applied to the surface in a process controlled manually by the user. By using hydrophobic liquid that has been mixed with UVA and/or UVB protective liquid, the presently disclosed system can also protect the driver and passengers from undesired UV radiation from the sun.

Washer fluid can also be applied to the surface, either automatically or in a process controlled manually by the user, if part of, or the whole surface to be cleaned, has dirt or debris that needs to be cleaned off the surface. The washer fluid may be applied by the cleaning system for example by mixing the washer fluid into the air jet.

A further aspect of the invention relates to the capability to eject hot air from the nozzles. By heating the air that leaves the system, the system can also remove ice from the surfaces. The heating is achieved by heating the pipes and/or nozzles electrically, or, alternatively, using a steam generator that generates that air entering the system.

The inventor has also realised that if the air flow to the nozzles is variable, an air jet suitable for the cleaning needs at each moment can be obtained. For example, if there is a need for a thorough cleaning of the surfaces, it is possible to temporarily increase the air flow to the maximum air flow capacity. Such an air flow level is not suitable for normal operating conditions since it consumes additional energy, but is preferably used for a shorter time period to clean the surfaces thoroughly. By allowing that the generated air flow is directed to a selection of nozzles, it is possible to obtain additional air flow for one or several selected areas that are in need of thorough cleaning. The idea is that by directing the total air flow capacity to only one (or a limited number of) nozzle(s), a temporary increased air flow capacity can be obtained for these nozzles.

A further aspect of the presently disclosed system relates to the possibilities to cover parts of the surface that would not be possible to reach with traditional pivoting wipers. By configuring the nozzles such that the air jet from each nozzle covers a predefined area of the surface, any area of the surface can be covered. A typical strategy when placing the nozzles would be to cover the entire surface, but it is also possible to cover only certain parts of the surface, for example to reduce the power consumption of the system or material and manufacturing cost of the system.

The present disclosure also relates to the freedom to place nozzles in any position near a surface to be cleaned. There are several advantages related to this freedom. For example the nozzles can be placed under the upper part of the bonnet of the vehicle, which makes them less distracting for the driver. They can also be placed close to surfaces which are more difficult to clean than others due to the natural air flow that is created when the vehicle moves. The nozzles can also be placed to generate air jets from two directions, or partly from two directions, meaning that they can operate on the same surface from different angles. The positioning of the nozzles can therefore improve the cleaning efficiency as well as minimize the power consumption of the system by placing fewer nozzles in areas that are less critical.

The generated air jets can also take advantage of the natural air flow that is created when the vehicle moves. If the nozzles are configured such that the ejected air jets are parallel to the direction, projected to the surface covered by the nozzles, in which the vehicle moves, the natural air flow and the air flow from the nozzles, a better cleaning effect is achieved. It is also possible to imagine that the generated air flow can be reduced accordingly to reduce the power consumption of the system. In one embodiment the cleaning system is formed or placed such that the air stream that is created when the vehicle moves forward works together with the air flow produced by the cleaning system. This allows for the flow in the cleaning system to be decreased as the speed of the vehicle is increasing. In this configuration liquid, such as washer fluid and/or hydrophobic liquid, may be applied. The liquid will then follow the combined air flow produced by the moving vehicle and the flow produced by the cleaning system.

It is important that the system is capable of cleaning not only the parts of the surface close to the nozzles but also the parts adjacent to the other end of the windshield/window. The air cone that comes out of a nozzle is typically either narrow with a long reach or wider with a shorter reach. The inventor has realised that by choosing the nozzles for the system such that the radial spread of the air cone that is created by the air jet leaving the nozzle is relatively small and the reach of the air jet is relatively long, large areas such as a windshield can be cleaned. A spray angle of for example 15 degrees can be considered relatively narrow in this context. A spray angle of for example 90 degrees can be considered relatively wide in this context. A nozzle based on high pressure air flow suitable for operating in the presently disclosed system could use an air pressure in the range 100 kPa-2000 kPa. Furthermore, by selecting nozzles with a small radial spread for shorter but broader surfaces, these surfaces can be cleaned with fewer nozzles. If the radial spread of the air cone is variable the reach and radial spread can be configured according to the wind conditions and the natural air flow that is created when the vehicle moves.

A further aspect of the presently disclosed invention relates to a system, wherein the nozzles can be pivoted to change the horizontal and/or vertical direction of the air jet. If pivotable nozzles are used, the number of nozzles may be reduced since a pivotable nozzle covers a larger surface than a fixed nozzle.

Hydrophobic liquid can be applied to the surface to be cleaned, which makes it easier to remove water from the surface. The nozzles and the system of pipes and/or tubes that is used to distribute the air to the nozzles may also be used to distribute the hydrophobic liquid over the surface. If the presently disclosed system is equipped with an inlet to the system of pipes and/or tubes and a mixer for mixing the hydrophobic liquid into the air jet, a separate system for applying the hydrophobic liquid can be saved.

Helmholtz resonance is the phenomenon of air resonance in a cavity. When air is forced into a cavity, the pressure inside increases. When the external force pushing the air into the cavity is removed, the higher-pressure air inside will flow out. The cavity will be left at a pressure slightly lower than the outside, causing air to be drawn back in. This process repeats with the magnitude of the pressure changes decreasing each time. Helmholtz resonators can be used to reduce sounds of specific frequencies, for example in architectural acoustics, aircraft engines and fans. By using Helmholtz resonators adjusted to suppress the sounds of the air flow generators of the present invention, a significantly more silent air jet based vehicle cleaning system can be obtained.

Depending on the size of the surfaces to be cleaned, the capacity of each air flow generator and the total capacity of the system, there are different grouping possibilities of nozzles and pipes/tubes systems. A system wherein all nozzles are connected to the same system of pipes and/or tubes is simple and efficient. However, if nozzles are grouped into subsystems that can be managed either independently or as one big system, the system may take into account additional information such as less wind on one side of the vehicle compared to the other side or sensors indicating a greater need for cleaning on certain surfaces compared to others. One example of a sensor, which could be used in the presently disclosed system, is a rain sensor on one or several surfaces, indicating the need for cleaning. The indication of rain from such a rain sensor may also be used to activate the air jet for a specific surface or for the whole system.

A further aspect of the presently disclosed system relates to spot detection i.e. at least one sensor capable of recognizing and indicating dirt and/or debris on areas of the surface to be cleaned. By pointing out specific areas that need to be cleaned, it is possible to direct the air flow capacity of the system to specific nozzles and specific areas of the surface to be cleaned. This feature can be seen both as a means to increase the cleaning capacity for the specific area or a means to save energy since only a subset of the nozzles are active.

The air flow of the air jet can be regulated based on the velocity of the vehicle. The advantage of regulating the air flow based on the velocity is that by using the natural air flow that is created when the vehicle moves, it is possible to operate the presently disclosed system with a lower effect and thereby reduce the power consumption. It is for example possible that the system operates at its maximum capacity for velocity less than a predefined limit, and that the system does not operate at all for velocity greater than another predefined limit. Between these two limits, the air flow can be inversely proportional to the velocity or directly proportional to the velocity with a negative variation constant. The inventor has also realised that if these calculations are instead based on the actual measured air flow at the surfaces, measured by means of a wind sensor, the operation of the system is more efficient since it takes into account the combined effect of the velocity of the vehicle and the wind.

One aspect of the invention relates to a controller, which can control the application of liquid on the surfaces, the mixing of a hydrophobic liquid into the air jet, and the air flow of the air jet. By implementing these functions in a computer based system, fast, reliable and flexible control can be achieved. Preferable the parameters for automatic use can be changed at any time by a user through an interface in the vehicle, or, as an alternative, the system can be controlled manually through the same interface.

The presently disclosed invention also relates to a vehicle incorporating the entire cleaning system for cleaning the surface of a windshield, window, light and side mirror as described above. The surfaces of the vehicle to be cleaned may comprise a hydrophobic material, which reduces the need for application of hydrophobic liquid during operation of the system. The surfaces of the vehicle may also have been coated with a hydrophobic liquid before the operation of the system, which may, if the product has long lasting capacity, make it possible to leave out the application of hydrophobic liquid during operation of the system.

In one embodiment the cleaning system further comprises a windshield, window, light or side mirror of a vehicle, wherein the windshield, window, light or side mirror has a hydrophobic coating. The surface may thereby be seen as an integral part of a system. The inventor has realized that treating the system as a whole, wherein the surface has a hydrophobic coating, is beneficial for the operation of the air jet based cleaning system. Preferably the hydrophobic coating has a contact angle greater than 110°, or between 110° and 150° for water and/or a contact angle greater than 70°, or between 70° and 100° for hexadecane. In one embodiment the surface is 0.5-2 $m^2$, which may correspond to the windshield of a car. The surface may also be 0.5-5 $m^2$ or 0.5-4 $m^2$. The air jet based cleaning system may thereby be dimensioned as described in the present disclosure for being capable of cleaning such a surface.

A further aspect of the invention relates to a method of regulating the air flow based on the velocity of the vehicle. One solution is that for velocity exceeding a maximum predefined level, for example 30 km/h, 40 km/h, 45 km/h, 46 km/h, 47 km/h, 48 km/h, 49 km/h, 50 km/h, 51 km/h, 52 km/h, 53 km/h, 54 km/h, 55 km/h, 60 km/h, 70 km/h, 80 km/h, 90 km/h or 100 km/h, the air jet cleaning system is shut off, and instead the natural air flow is used to clean the surfaces. This can also be done partially, i.e. the air jet for the surfaces that are exposed to stronger natural air flow are shut off while other surfaces may still be cleaned with the presently disclosed system. For velocity below a predefined minimum level, for example 2 km/h, 4 km/h, 6 km/h, 8 km/h, 10 km/h, 12 km/h, 14 km/h, 16 km/h, 18 km/h or 20 km/h, 25 km/h, it is assumed that the natural air flow from the velocity is negligible, hence the air jet based cleaning system can operate without taking the natural air flow into consideration. Between the maximum and minimum predefined velocity levels the air flow of the air jet can be inversely proportional to the velocity or directly proportional to the velocity with a negative variation constant.

As an example, if the upper limit is 50 km/h, the system operates at 0% of its capacity for velocity greater than 50 km/h. If the lower limit is 10 km/h, the system operates as if the vehicle was standing still. In this example, the simplest approach means that the system operates at 100% of its capacity for velocity less than 10 km/h. In this case the meaning of "directly proportional to the velocity with a negative variation constant" would be that the equation of proportionality, $y=a+bx$, can be written as $P=125-2.5\,v$, where P is the effect of the system in per cents of its maximum capacity and v is the velocity. The equation is only valid for velocities between 10 km/h and 50 km/h. For example, if the velocity is 30 km/h, the system operates at $125-2.5*30=50\%$ of its capacity.

The method involves extracting the velocity of the vehicle either directly from the speedometer of the vehicle or indirectly from the electrical system or built-in computer of the vehicle. Alternatively the velocity can be measured by means of for example a GPS application.

If instead wind sensors are used on the surfaces to be cleaned, using a sensor capable of measuring the direction and speed of the wind on the surface, it is possible to use the actual air flow, generated as a combination of wind and the velocity of the vehicle, instead of only the velocity as described above. The principle for this method is otherwise the same as in the method described above i.e. for a combined measured air flow greater than a predefined limit in the same direction as the air flow from the nozzles, thus assisting the cleaning, for example 30 km/h, 40 km/h, 45 km/h, 46 km/h, 47 km/h, 48 km/h, 49 km/h, 50 km/h, 51 km/h, 52 km/h, 53 km/h, 54 km/h, 55 km/h, 60 km/h, 70 km/h, 80 km/h, 90 km/h or 100 km/h, the air jets from the presently disclosed system can be shut off. Similarly, for a combined measured air flow less than a predefined limit in the same direction as the air flow from the nozzles, for example 2 km/h, 4 km/h, 6 km/h, 8 km/h, 10 km/h, 12 km/h, 14 km/h, 16 km/h, 18 km/h or 20 km/h, 25 km/h, the air jet based vehicle cleaning system can operate without taking the wind sensor data into further calculation, and for measured air flows between the predefined limits levels the air flow of the air jet can be inversely proportional to the measured air flow or directly proportional to the measured air flow with a negative variation constant.

DETAILED DESCRIPTION OF DRAWINGS

The invention will in the following be described in greater detail with reference to the accompanying drawings. The drawings are exemplary and are intended to illustrate some of the features of the presently disclosed air jet based cleaning system, and are not to be construed as limiting to the presently disclosed invention.

Figure 1:
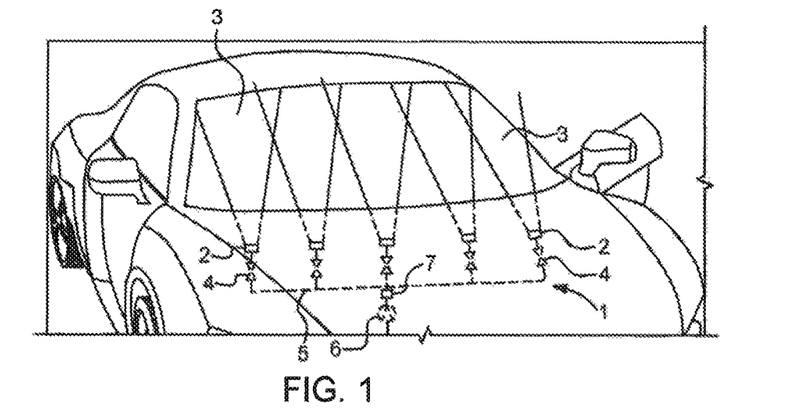
FIG. 1 shows an air jet based vehicle cleaning system comprising nozzles, valves, pipes for distributing air to the nozzles, an air compressor tank and an air compressor.

FIG. 1 shows an embodiment of the presently disclosed air jet based cleaning system 1. The system comprises a number of nozzles 2, which generate air jets 3 that cover parts of the surface to be cleaned. The air jets together can cover the entire surface to be cleaned or selected parts. In the embodiment in FIG. 1 each nozzle has a valve 4, which can be used to enabled and disable the individual nozzles. The nozzles are connected with one common pipe 5 that distributes the air to the individual nozzles. In this embodiment the air flow is generated by means of an air compressor 6 and a compressor tank 7.

The difference in FIG. 2 compared to FIG. 1 is that the nozzles 2 are of a type that can generate high air flow with low air pressure. As can be seen in FIG. 2 this means that there is no need for an air compressor—instead a low pressure high flow air pump 8 is used for generating the air flow.

Figure 3:
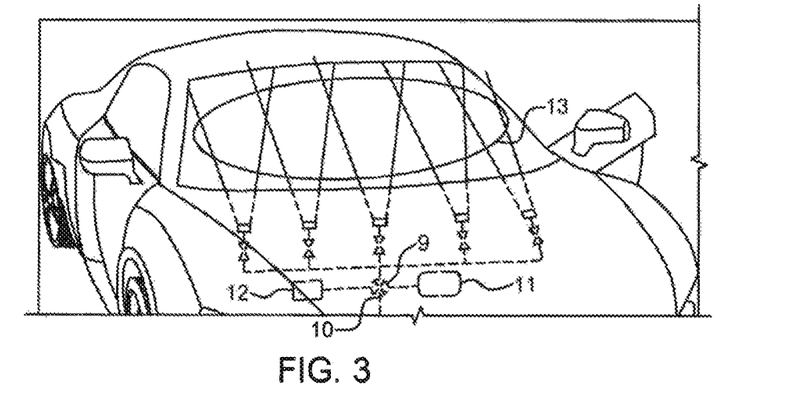
FIG. 3 shows an air jet based vehicle cleaning system with an inlet to the system of pipes and/or tubes allowing the system to mix a hydrophobic liquid into the air jet, and a controller to control the mixing of air and hydrophobic liquid.

FIG. 3 shows how hydrophobic liquid can be mixed into the air distribution system. The mixer 9 mixes air from an air flow in pipe 10 and hydrophobic liquid from a container 11. The mix can then be applied to the surface 13 to be cleaned. A controller 12 controls the mixing and application of hydrophobic liquid.

Figure 4:
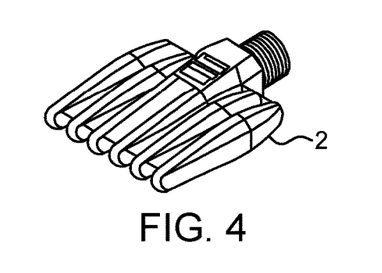
FIG. 4 shows an example of a nozzle.

FIG. 4 shows an example of a flat nozzle 2 that generates a strong, efficient blowing force.

Figure 5:
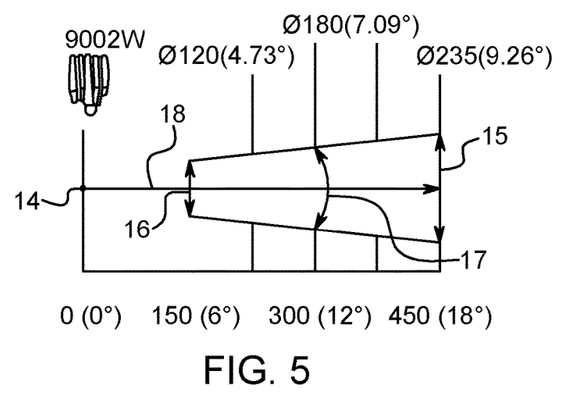
FIG. 5 shows an example of an air cone produced by a nozzle.

FIG. 5 shows the blowing pattern (air cone) of the nozzle in FIG. 4. Naturally, the spread expressed in a distance is greater further away from the nozzle outlet point 14. Hence, the spread 15 is greater than the spread 16. The radial spread is more commonly expressed in degrees. The radial spread 17 around the axis 18 in the figure is also significant for the reach of the air jet. A smaller radial spread typically means a longer reach of the air jet along the axis 18.

Figure 6:
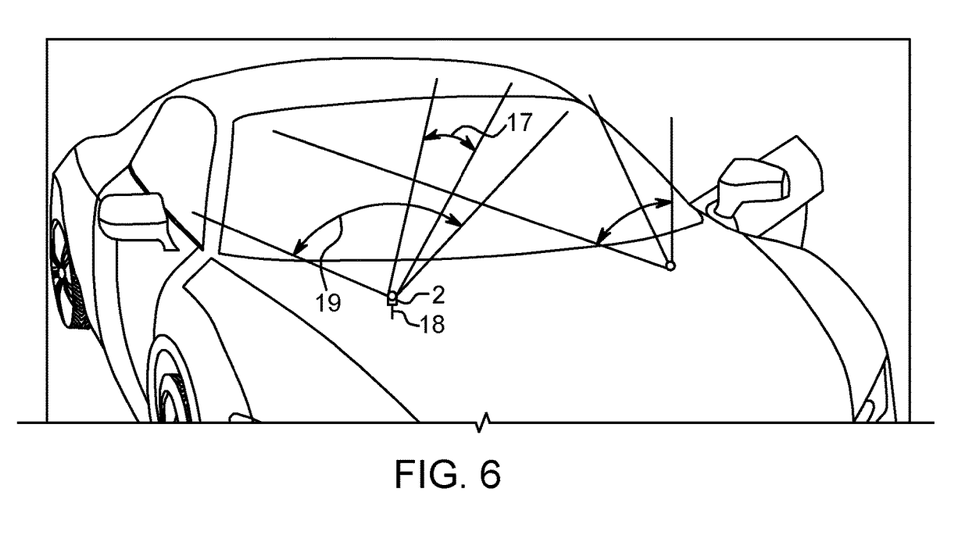
FIG. 6 shows an air jet based vehicle cleaning system, wherein the nozzles can be pivoted to change the horizontal direction of the air jet.

In FIG. 6 the nozzle 2 is pivotable. The air pipe 18 is identical to the pipes in the previous drawings. In this embodiment the radial spread 17 can be relatively small in order for the air jet to reach to the upper limit of the windshield. Since the nozzles are pivotable, each nozzle can cover the surface within a sector 19 and thereby the windshield can be covered with only two nozzles.

Figure 7:
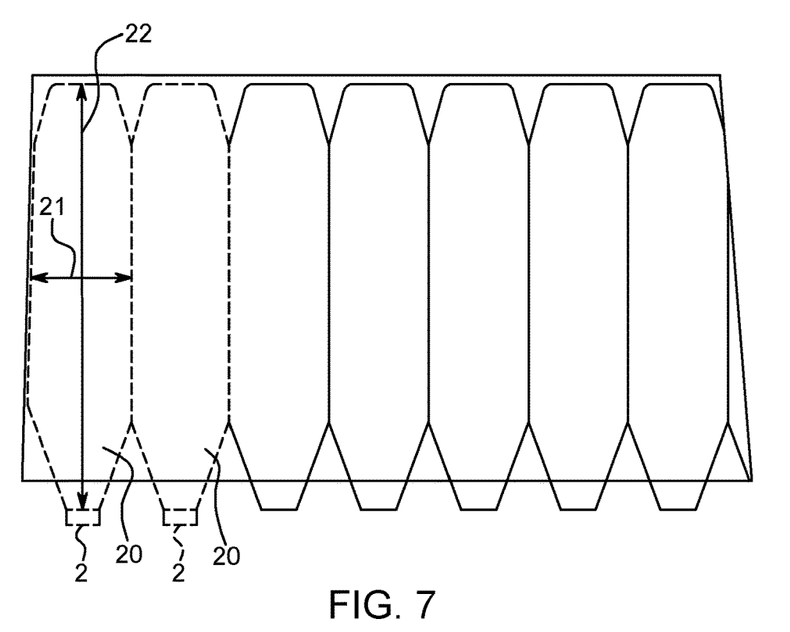
FIG. 7 shows the surfaces on a windshield covered by the nozzles in an air jet based vehicle cleaning system.

FIG. 7 illustrates how the shapes of the air jets may be configured to cover the surface (windshield) to be cleaned efficiently. A nozzle 2 covers a part of the surface 20 while another nozzle 2 covers another part of the surface 20. By varying the width 21 and the height 22 of the air jet different sizes and shapes of surfaces can be covered. Also the number of nozzles can be chosen such that the optimal coverage, cleaning efficiency and power consumption is achieved.

Figure 8:
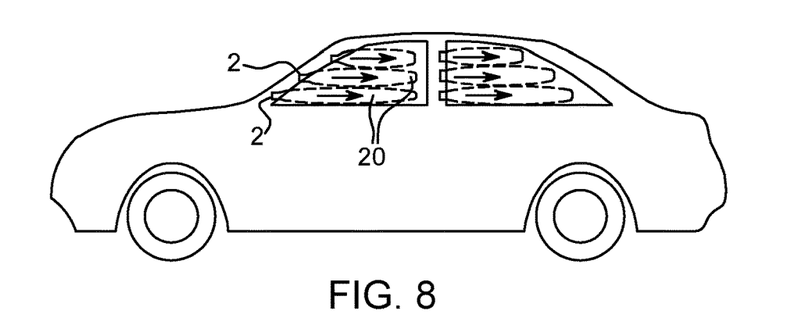
FIG. 8 shows the surfaces on the side windows of a vehicle covered by the nozzles in an air jet based vehicle cleaning system.

FIG. 8 shows a similar setup for a side window. In this embodiment the nozzles 2 are placed at the forefront of the side window, generating air jets covering areas 20. The nozzles 2 are placed at the forefront of the side window in order to take advantage of the natural air flow that arises when the vehicle moves forward.

Figure 9:
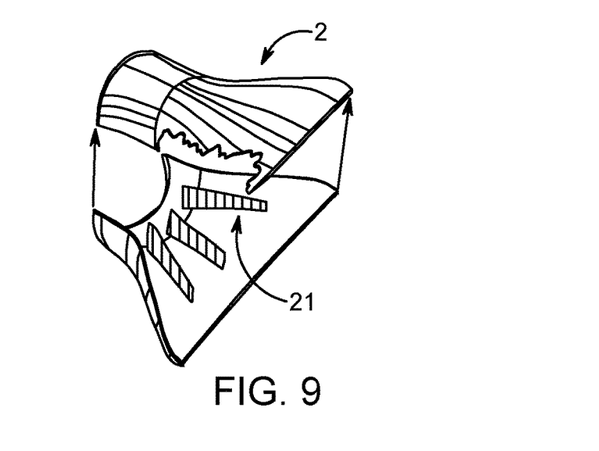
FIG. 9 shows an example of a nozzle having guide vanes for directing the air flow.

FIG. 9 shows an example of a nozzle 2 having guide vanes 21 for directing the air flow. The guide vanes may be adjustable for example to adapt the air flow to external conditions or to direct a stronger air flow to areas where the air has to cover a longer or area on the surface.

Figure 10:
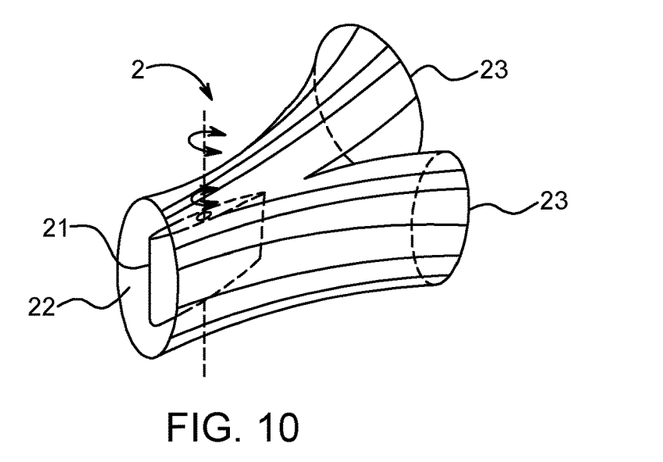
FIG. 10 shows a duct splitting the air into two outlets, the duct having a guide vane.

FIG. 10 shows a duct 22 splitting the air into two outlets 23. The duct 22 has a configurable guide vane 23 for adjusting how the air flow is directed to the two outlets 23.

Figure 11:
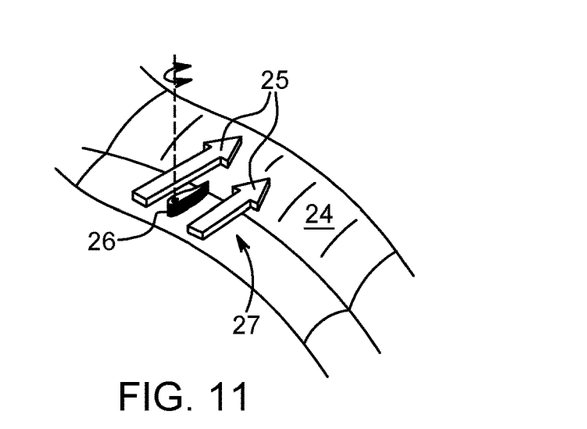
FIG. 11 shows an external guide element for directing the air flowing out of nozzles.

FIG. 11 shows an external guide element 26 for directing the air flowing out of nozzles. 25 are illustration of the air flow towards a windshield 24. The guide element 26 may be used to direct both air from the presently disclosed cleaning system and air flow emerging relative to the vehicle when the vehicle moves such that the two air flows work together. The guide element 26 may be a fixed guide element or a configurable guide element.

FIG. 12 shows a nozzle 2 having a substantially elongated and flat outlet. This nozzle design may be an efficient option for distributing air over a surface within the scope of the presently disclosed cleaning system. In the second part of FIG. 12 a cross-section of a nozzle is shown, which has a curved and irregular upper edge for distributing the air flow to a particular surface or windshield.

Figure 13:
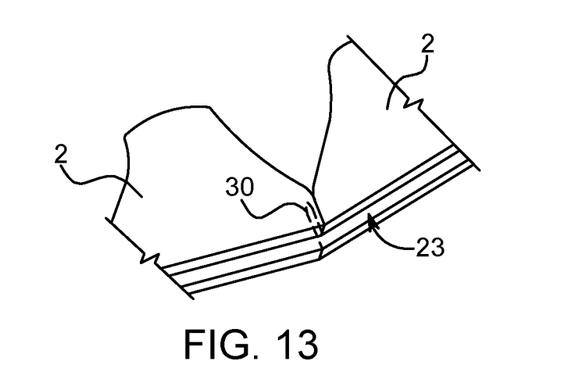
FIG. 13 shows two neighbouring nozzles abutting each other.

FIG. 13 shows two neighbouring nozzles 2 abutting each other. The nozzles have substantially flat and elongated outlets which are integrated to a common outlet. The sides of the nozzles abutting each other are formed such that the nozzles are fluidly connected in a section towards the outlet, such that the plurality of outlets appear as one continuous outlet towards the surface or windshield.

FIG. 14 shows an array of nozzles 2 abutting each other and forming a section 31 of an ellipsoid. The section 31 of the ellipsoid may be curved over the surface to clean such that air is also spread towards the sides. The section 31 of the ellipsoid may be curved in substantially the same plane as the surface to clean.

Figure 15:
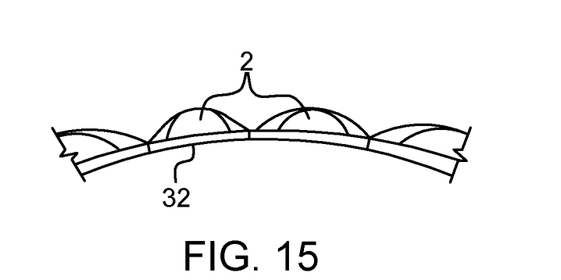
FIG. 15 shows an array of nozzles abutting each other and forming a section of an ellipsoid in a vertical plane.

FIG. 15 shows an array of nozzles 2 abutting each other and forming a section 32 of an ellipsoid in a vertical plane.

FURTHER DETAILS OF THE INVENTION

1. A cleaning system for cleaning the surface of a windshield, window, light and side mirror of a vehicle or the surface of a window of a building, comprising at least one air flow generator, a plurality of nozzles, and a system of pipes and/or tubes to distribute the air flow to the nozzles, the system configured such that air jets are ejected by the nozzles and distributed over the surface.
2. The cleaning system according to any of the preceding items, wherein the system of pipes and/or tubes are ducts connecting the air flow generator and nozzles.
3. The cleaning system according to any of the preceding items, wherein the nozzles are an integral part of the system of pipes and/or tubes.
4. The cleaning system according to any of the preceding items, wherein a pressure inside the system is lower than 10.000 Pa, preferably lower than 7.000, even more preferably lower than 5.000 Pa.
5. The cleaning system according to any of the preceding items, wherein the cleaning system is configured to generate an air flow of 50-2000 m$^3$/hour, or 100-1500 m$^3$/hour, or 100-1000 m$^3$/hour or 300-800 m$^3$/hour.
6. The cleaning system according to any of the preceding items, wherein the system is configured to generate an air flow of 10-200 m/s, more preferably 30-150 m/s, even more preferably 50-130 m/s for air flowing out of the nozzles.
7. The cleaning system according to any of the preceding items, wherein the air flow generators is/are centrifugal blower(s).
8. The cleaning system according to any of the preceding items, the ducts and/or nozzles comprising guide vanes for directing the air flow.
9. The cleaning system according to item 8, wherein the guide vanes are configured to compensate for placement of the nozzles in relation to the surface such that the air flow is more evenly distributed.
10. The cleaning system according to item 8, wherein the guide vanes are configured to compensate for side wind or other aerodynamic effects.
11. The cleaning system according to any of items 8-10, wherein the guide vanes are adjustable for adapting the air flow to external conditions.
12. The cleaning system according to any of the preceding items, further comprising at least one guide elements mounted between the nozzles and the surface, the guide elements configured to compensate for placement of the nozzles in relation to the surface such that the air flow is more evenly distributed and/or compensate for side wind or other aerodynamic effects.
13. The cleaning system according to any of the preceding items, wherein the nozzles are pointed, preferably pointed cone-shaped.
14. The cleaning system according to any of the preceding items, wherein cross-sections of outlets of the nozzles are elongated and low, such as having a height of less than 10 mm, more preferably less than 8 mm, even more preferably less than 5 mm, most preferably less than 2 mm.
15. The cleaning system according to any of the preceding items, wherein cross-sections of outlets of the nozzles have curved shapes and/or irregular shapes arranged to create air flow specifically adapted to the shape of the surface.
16. The cleaning system according to any of the preceding items, wherein neighbouring nozzles are configured to abut each other, thereby creating a continuously shaped air flow.
17. The cleaning system according to item 16, wherein a distal part of the plurality of nozzles is formed such that air can flow between the nozzles.
18. The cleaning system according to any of the preceding items, wherein the nozzles are configured such that the angle between the surface and the outlet direction of the air jet is 15, 14, 13, 12, 11, 10, 9, 8, 7, 6, 5, 4, 3, 2 or 1 degree(s), or 0 degrees (parallel).
19. The cleaning system according to any of the preceding items, wherein the nozzles are placed 10 cm, or 8 cm, or 6 cm, or 4 cm, or 2 cm from the windshield.
20. The cleaning system according to any of the preceding items, wherein the nozzles are configured such that the angle between the surface and the outlet direction equals half the radial spread of the generated air cone.
21. The cleaning system according to any of the preceding items, configured such that hydrophobic liquid is applied through the cleaning system to the surface automatically at predefined intervals.
22. The cleaning system according to any of the preceding items, configured such that hydrophobic liquid is applied to the surface in a process controlled manually by the user.
23. The cleaning system according to items 22, wherein the hydrophobic liquid comprises UVA and/or UVB protective liquid.
24. The cleaning system according to any of the preceding items, configured such that the air jet from each nozzle covers a predefined area of the surface.
25. The cleaning system according to any of the preceding items, configured such that washer fluid is applied to the surface automatically or in a process controlled manually by the user.

26. The cleaning system according to any of the preceding items, configured such that the air in the ejected air jets is hot.
27. The cleaning system according to any of the preceding items, wherein the generated air flow is variable.
28. The cleaning system according to any of the preceding items, configured such that the generated air flow is directed to a limited selection of nozzles.
29. The cleaning system according to any of the preceding items, wherein the nozzles destined for operating on the windshield are configured to be placed below the windshield, such as hidden under the upper part of the bonnet of the vehicle.
30. The cleaning system according to any of the preceding items, wherein the plurality of nozzles form a curved array of nozzles along the windshield.
31. The cleaning system according to any of the preceding items, wherein the plurality of nozzles form a section of an ellipsoid.
32. The cleaning system according to any of items 30-31, wherein the ellipsoid has one component parallel to the surface and/or one component perpendicular to the surface.
33. The cleaning system according to any of items 30-32, wherein the ellipsoid is curved over the surface.
34. The cleaning system according to any of items 30-33, wherein the ellipsoid is arranged substantially along and/or parallel to a lower edge of the windshield bulging into the center of the windshield.
35. The cleaning system according to any of items 30-34, wherein the height of the bulging is 1-25 cm, or 1-20 cm, or 1-15 cm, or 1-10 cm.
36. The cleaning system according to any of items 30-35, wherein the array of nozzles are configured to blow air distributed in a substantial ellipsoidal distribution over the surface.
37. The cleaning system according to any of the preceding items, wherein the nozzles destined for operating on the windshield are configured to be placed above the windshield.
38. The cleaning system according to any of the preceding items, wherein the nozzles destined for operating on the windshield are configured to be placed both below and above the windshield.
39. The cleaning system according to any of the preceding items, wherein the nozzles destined for operating on the windshield are configured to be placed at any edge of the windshield.
40. The cleaning system according to any of the preceding items, wherein the nozzles destined for operating on the rear window of the vehicle are configured to be placed above the rear window.
41. The cleaning system according to any of the preceding items, wherein the nozzles destined for operating on the rear window of the vehicle are configured to be placed at any edge of the rear window.
42. The cleaning system according to any of the preceding items, wherein the nozzles destined for operating on the side windows of the vehicle are configured to be placed above the side windows.
43. The cleaning system according to any of the preceding items, wherein the nozzles destined for operating on the side windows of the vehicle are configured to be placed at the front edge (the edge closest to the front of the vehicle) of the side windows.
44. The cleaning system according to any of the preceding items, wherein the nozzles destined for operating on the side windows of the vehicle are configured to be placed both above and at the front edge (the edge closest to the front of the vehicle) of the side windows.
45. The cleaning system according to any of the preceding items, wherein the nozzles destined for operating on the side windows of the vehicle are configured to be placed at any edge of the side windows.
46. The cleaning system according to any of the preceding items, wherein the nozzles are configured such that the ejected air jets are parallel to the direction, projected to the surface covered by the nozzles, in which the vehicle moves.
47. The cleaning system according to any of the preceding items, wherein the nozzles are configured to eject air jets with a radial spread of less than 15 degrees relative to the axis of the pointing direction of the nozzle.
48. The cleaning system according to any of the preceding items, wherein the nozzles are configured to eject a variable radial spread of the air jet.
49. The cleaning system according to any of the preceding items, wherein the nozzles can be pivoted to change the horizontal direction of the air jet.
50. The cleaning system according to any of the preceding items, wherein the nozzles can be pivoted to change the vertical direction of the air jet
51. The cleaning system according to any of the preceding items, further comprising an inlet to the system of pipes and/or tubes, a mixer for mixing the hydrophobic liquid into the air jet, and thereby distribute the hydrophobic liquid over the surface.
52. The cleaning system according to any of the preceding items, further comprising at least one Helmholtz resonator, attached to or integrated with the air flow generator, configured to reduce the sound volume of the generated air flow.
53. The cleaning system according to any of the preceding items, wherein all nozzles are connected to the same system of pipes and/or tubes.
54. The cleaning system according to any of the preceding items, wherein nozzles are grouped to be connected to separate subsystems of pipes and/or tubes.
55. The cleaning system according to any of the preceding items, further comprising at least one rain sensor on the surface.
56. The cleaning system according to item 55, configured such that the air jet starts to operate automatically when the rain sensor indicates rain.
57. The cleaning system according to any of the preceding items, further comprising at least one sensor that indicates the presence of dirt and/or debris on selected predefined areas of the surface.
58. The cleaning system according to item 57, configured such that system automatically cleans the areas for which the sensor indicates the presence of dirt and/or debris.
59. The cleaning system according to any of the preceding items, configured such that the air flow of the air jet is regulated based on the velocity of the vehicle, such that a predefined maximum level of air flow is produced for velocity less than a predefined limit.
60. The cleaning system according to any of the preceding items, configured such that the air flow of the air jet is regulated based on the velocity of the vehicle, such that the air flow of the air jet for velocity greater than a predefined limit is inversely proportional to the velocity or directly proportional to the velocity with a negative variation constant.

61. The cleaning system according to any of the preceding items, further comprising at least one wind sensor capable of measuring the direction and speed of the wind on the surface.
62. The cleaning system according to item 61, configured such that the air flow of the air jet is regulated based on the measured wind, such that a predefined maximum level of air flow is produced for wind less than a predefined limit, and the air flow of the air jet for wind greater than a predefined limit is inversely proportional to the velocity or directly proportional to the velocity with a negative variation constant.
63. The cleaning system according to any of the preceding items, further comprising a controller configured to control the application of a liquid, the mixing of a hydrophobic liquid into the air jet, and the air flow of the air jet.
64. The cleaning system according to any of the preceding items, further comprising a windshield, window, light or side mirror of a vehicle, wherein the windshield, window, light or side mirror has a hydrophobic coating.
65. The cleaning system according to item 64, wherein the hydrophobic coating has a contact angle greater than 110°, or between 110° and 150° for water.
66. The cleaning system according to any of items 64-65, wherein the hydrophobic coating has a contact angle greater than 70°, or between 70° and 100° for hexadecane.
67. The cleaning system according to any of items 64-66, wherein the surface is 0.5-5 $m^2$, or 0.5-4 $m^2$, or 0.5-2 $m^2$.
68. Vehicle comprising and/or incorporating the cleaning system for cleaning the surface of a windshield, window, light and side mirror according to any of the preceding items.
69. Vehicle according to item 68, wherein the surface has been coated with a hydrophobic liquid.
70. Vehicle according to any of items 68-69, wherein the surface comprises a hydrophobic material.
71. Method for regulating the air flow of the air jet used in a vehicle cleaning system for cleaning the surface of a windshield, window, light and side mirror, by regulating the air flow of the air jet based on the velocity of the vehicle such that a predefined maximum level of air flow is produced for velocity less than a predefined limit.
72. Method according to item 71, wherein the air flow of the air jet for velocity greater than a predefined limit is inversely proportional to the velocity or directly proportional to the velocity with a negative variation constant, using a controller.
73. Method according to any of items 71-72, wherein the air flow is enabled when a rain sensor indicates rain.
74. Method according to any of items 71-73, wherein the velocity of the vehicle is extracted from the speedometer of the vehicle.
75. Method according to any of items 71-74, wherein the velocity of the vehicle is extracted from a GPS receiver.
76. Method according to any of items 71-75, wherein wind sensor data is used to calculate the combined effect of the velocity of the vehicle and the wind.
77. Method according to item 71, wherein the air flow of the air jet is controlled manually by the user from a control panel in the vehicle.
78. Method according to item 71, wherein the air flow of the air jet is controlled manually by the user from a mobile application, such as a mobile smartphone application.
79. A system for controlling the air flow of an air jet used in a vehicle cleaning system according to the method of items 71-78, using a system according to items 1-67.
80. A method for cleaning a surface of a windshield, window, light and side mirrors, using a cleaning system comprising at least one air flow generator, a plurality of nozzles, and a system of pipes and/or tubes to distribute the air flow to the nozzles, the system configured such that air jets are ejected by the nozzles and distributed over the surface.
81. A method according to item 80, wherein hydrophobic liquid is applied to the surface to be cleaned by mixing the hydrophobic liquid into the air jet, and thereby distributing the hydrophobic liquid over the surface.

The invention claimed is:

1. A cleaning system for cleaning a surface of a windshield window, light or side mirror of a vehicle or the surface of a window of a building, comprising:
   at least one air flow generator;
   a plurality of nozzles comprising guide vanes; and
   a system of pipes and/or tubes to distribute air flow to the nozzles;
   the plurality of nozzles forming a curved array of nozzles over the surface such that air jets are ejected by the nozzles and distributed over the surface, and the guide vanes directing the air flow.
2. The cleaning system according to claim 1, wherein the system of pipes and/or tubes are ducts connecting the air flow generator and nozzles.
3. The cleaning system according to claim 1, wherein the nozzles are an integral part of the system of pipes and/or tubes.
4. The cleaning system according to claim 1, wherein the guide vanes are configured to compensate for placement of the nozzles in relation to the surface such that the air flow is more evenly distributed.
5. The cleaning system according to claim 1, wherein the guide vanes are configured to compensate for side wind or other aerodynamic effects.
6. The cleaning system according to claim 1, wherein the guide vanes are adjustable for adapting the air flow to external conditions.
7. The cleaning system according to claim 1, further comprising at least one guide element mounted between the nozzles and the surface, the guide elements configured to compensate for placement of the nozzles in relation to the surface such that the air flow is more evenly distributed and/or compensate for side wind or other aerodynamic effects.
8. The cleaning system according to claim 1, wherein cross sections of outlets of the nozzles are elongated and low, such as having a height of less than 10 mm, or less than 8 mm, or less than 5 mm, or less than 2 mm.
9. The cleaning system according to claim 1, wherein neighboring nozzles abut each other, thereby creating a continuously shaped air flow.
10. The cleaning system according to claim 9, wherein a distal part of the plurality of nozzles is formed such that air can flow between the nozzles.
11. The cleaning system according to claim 1, wherein the nozzles are configured such that an angle between the surface and a outlet direction of each air jet is in the range of 0-15° or 1-15°.

12. The cleaning system according to claim 1, wherein the nozzles are mounted 10 cm, or 8 cm, or 6 cm, or 4 cm, or 2 cm from the windshield.

13. The cleaning system according to claim 1, wherein the nozzles are configured such that an angle between the surface and an outlet direction equals half a radial spread of a generated air cone.

14. The cleaning system according to claim 1, further comprising means for applying hydrophobic liquid to the surface.

15. The cleaning system according to claim 1, wherein the plurality of nozzles form a curved array of nozzles along the windshield.

16. The cleaning system according to claim 15, wherein the plurality of nozzles form a section of an ellipsoid.

17. The cleaning system according to claim 16, wherein the ellipsoid has one component parallel to the surface and/or one component perpendicular to the surface.

18. The cleaning system according to claim 16, wherein the ellipsoid is curved over the surface.

19. The cleaning system according to claim 16, wherein the ellipsoid is arranged substantially along and/or parallel to a lower edge of the windshield curving into the center of the windshield.

20. The cleaning system according to claim 19, wherein a height of the curving is 1-25 cm, or 1-20 cm, or 1-15 cm, or 1-10 cm.

21. The cleaning system according to claim 15, wherein the array of nozzles are configured to blow air distributed in a substantial ellipsoidal distribution over the surface.

22. The cleaning system according to claim 1, further comprising a controller configured to control an application of a liquid, and mixing of a hydrophobic liquid into at, least one air jet, and the air flow of each air jet.

23. The cleaning system according to claim 1, further comprising a windshield, window, light or side mirror of a vehicle, wherein the windshield, window, light or side mirror has a hydrophobic coating.

24. The cleaning system according to claim 23, wherein the hydrophobic coating has a contact angle greater than 110°, or between 110° and 150°, for water.

25. The cleaning system according to claim 23, wherein the hydrophobic coating has a contact angle greater than 70°, or between 70° and 100°, for hexadecane.

26. The cleaning system according to claim 23, wherein the surface has an area of 0.5-2 m².

27. A cleaning system for cleaning, a surface of a windshield, window, light or side mirror of a vehicle or the surface of a window of a building, comprising:
at least one air flow generator;
a plurality of nozzles; and
a system of pipes and/or tubes to distribute air flow to the nozzles;
the plurality of nozzles forming a curved array of nozzles over the surface such that air jets are ejected by the nozzles and distributed over the surface, neighboring ones of the plurality of nozzles abutting each other to create a continuously shaped air flow.

* * * * *